J. OLSON.
Improvement in Fly-Catchers.
No. 132,733. Patented Nov. 5, 1872.
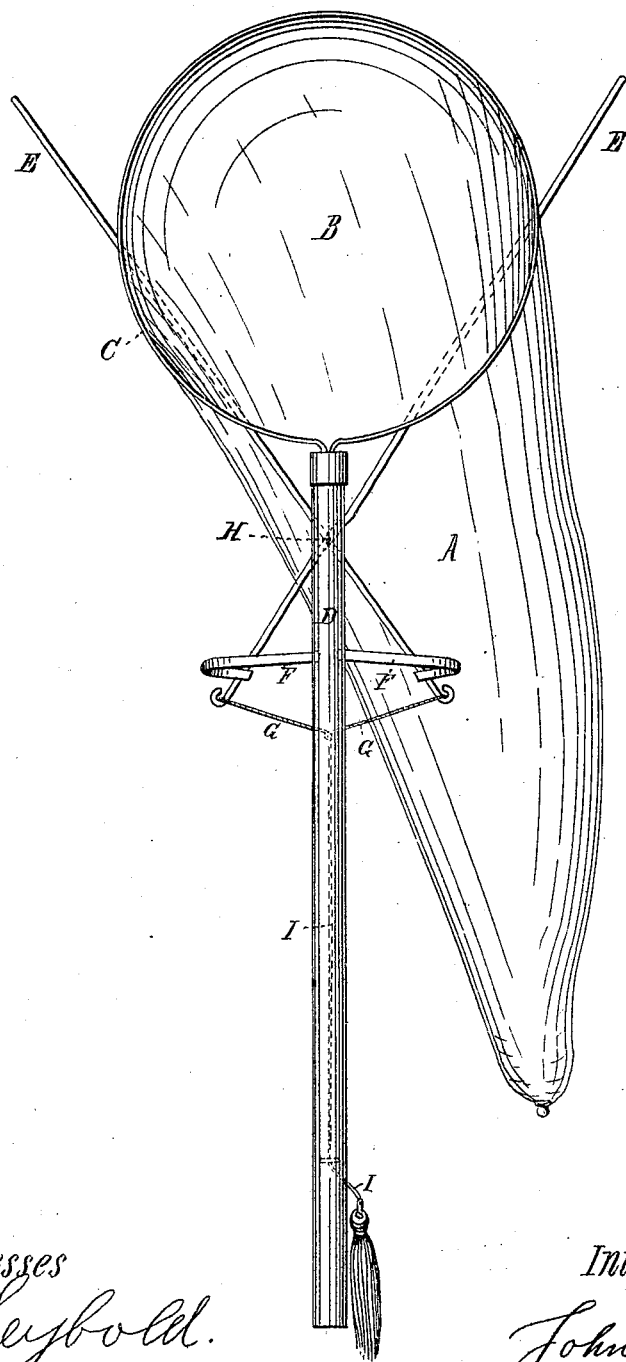
Witnesses
F. J. Seybold.
George S. Benton.
Inventor.
John Olson.

UNITED STATES PATENT OFFICE.

JOHN OLSON, OF CHICAGO, ILLINOIS.

IMPROVEMENT IN FLY-CATCHERS.

Specification forming part of Letters Patent No. 132,733, dated November 5, 1872.

*To all whom it may concern:*

Be it known that I, JOHN OLSON, of the city of Chicago, county of Cook, and the State of Illinois, have invented a new and useful Improvement in Fly-Catchers; and I do hereby declare the following to be a full, clear, and exact description thereof, which will enable those skilled in the art to which my invention appertains to make and use the same, reference being had to the accompanying drawing forming a part of this specification, in which—

Figure 1 is a representation of a complete fly-catcher, and in which A represents the net hung on a hoop, C, whose opening is B, and in which E E are tongs hung on a pivot, H, and closed by the cords G and J. D is the standard that supports the hoop C, on which the net A is hung.

The mode of operating my machine is as follows: Grasp the standard D and pass the net through the air toward the flies, which pass into the net A at B. Then by pulling the cords G and J the tongs E E clasp the net together behind the hoop C, closing the mouth of the net completely together behind the hoop C, and thus preventing the egress of the flies or other insects.

The flies or other insects are then destroyed by putting the net in hot water or in any other desirable way.

What I claim as new and as my invention, and wish to secure by Letters Patent, is—

The combination of the net A with the hoop C, the standard D, the cords G and J, and spring F, the pivot H, and the tongs E E, all arranged to operate substantially as and for the purposes described.

JOHN OLSON.

Witnesses:
F. J. SEYBOLD,
GEORGE S. BENTON.